United States Patent [19]

Hughes et al.

[11] 4,093,178
[45] June 6, 1978

[54] VALVE

[75] Inventors: Robert T. Hughes, Columbia; R. Hurley Matthews, Bel Aire, both of Md.

[73] Assignee: Humat, Inc., Washington, D.C.

[21] Appl. No.: 667,312

[22] Filed: Mar. 16, 1976

[51] Int. Cl.² .......................................... F16K 35/02
[52] U.S. Cl. ................................ 251/104; 251/110; 251/305; 251/306; 251/297
[58] Field of Search ..................... 251/89, 95, 98, 99, 251/100, 101, 108, 109, 229, 292, 305, 306, 307, 308, 309, 110, 102, 104, 105, 107, 297

[56] References Cited

U.S. PATENT DOCUMENTS

| 657,059 | 8/1900 | Broomell | 251/110 |
|---|---|---|---|
| 961,466 | 6/1910 | Shade | 251/109 |
| 1,032,649 | 7/1912 | Bieniek | 251/109 |
| 1,217,700 | 2/1917 | Brown et al. | 251/109 |
| 1,857,477 | 5/1932 | Ritter | 251/308 |
| 2,114,168 | 4/1938 | Auger | 251/305 |
| 2,577,260 | 12/1951 | Moore | 251/292 |
| 2,873,942 | 2/1959 | Drane | 251/305 |
| 3,329,394 | 7/1967 | Overbaugh | 251/99 |
| 3,355,141 | 11/1967 | Cooper | 251/101 |
| 3,395,886 | 8/1968 | Fawkes | 251/229 |
| 3,442,488 | 5/1969 | Adams | 251/305 |
| 3,521,857 | 7/1970 | Over | 251/305 |
| 3,648,970 | 3/1972 | Hartmann et al. | 251/110 |
| 3,771,759 | 11/1973 | Pouquette | 251/305 |
| 3,809,361 | 5/1974 | Pfundstein et al. | 251/305 |

Primary Examiner—Martin P. Schwadron
Assistant Examiner—G. L. Walton
Attorney, Agent, or Firm—Sughrue, Rothwell, Mion, Zinn and Macpeak

[57] ABSTRACT

A butterfly type valve is provided with an annular sealing ring disposed in a groove in the bevelled periphery of the circular valve plate. The operating shaft is journalled in a radially disposed external boss and an operating handle having a spring biased locking plunger is secured to the shaft. A locking plate having a plurality of locking apertures is adjustably clamped to the boss for operative engagement with the locking plunger on the handle.

3 Claims, 4 Drawing Figures

VALVE

BACKGROUND OF THE INVENTION

1. Field of the Invention

The present invention is directed to a butterfly type valve construction and more specifically to a butterfly type valve construction having sealing means and adjustable locking means.

2. Prior Art

Butterfly valves are old and well known in the art and generally consist of a circular plate pivoted diametrically within a cylindrical conduit. Most prior art constructions utilize a metal-to-metal contact between the plate and conduit. While accurate tolerances to prevent undue leakage can be achieved initially, excessive leakage invariably occurs due to wear between the plate and conduit. Proposals have been made in the past to provide the conduit with an offset surface for engagement by the opposed surfaces of the valve plate. However, the use of such offset valve seats protruding into the conduit restrict the flow of fluid through the conduit in an objectionable manner.

While some form of locking device has been provided in the past for a valve operating shaft. Such locking devices were generally rigid with the conduit so that it was impossible to compensate for wear of the valve members. In other words, the valve member would always be locked in the same place even though the valve no longer was disposed in close fitting relation with the seat thereby causing undue leakage.

SUMMARY OF THE INVENTION

The valve according to the present invention provides a new and unobvious sealing arrangement for butterfly type valves wherein an annular groove is provided in the bevelled peripheral surfaces of the circular valve plate and sealing ring is secured therein for engagement with the smooth cylindrical walls of the conduit. Such an arrangement also provides a superior sealing engagement between the circular valve disc and the cylindrical conduit in the event the sealing ring should wear out or be displaced due to the provision of two parallel sealing surfaces on the periphery of the disc spaced apart by a groove.

The present invention provides a new and improved adjustable locking arrangement for the shaft of butterfly type valves whereby the locking members can be adjusted to compensate for wear between the valve member and seat therefor.

The foregoing and other objects, features and advantages of the invention will be apparent from the following more particular description of preferred embodiments of the invention as illustrated in the accompanying drawings.

DETAILED DESCRIPTION OF THE PREFERRED EMBODIMENTS

Figure 1:
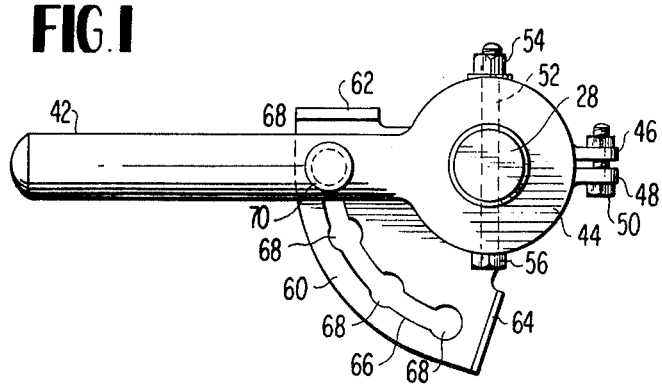
FIG. 1 is a top plan view of the valve and locking arrangement according to the present invention.
Figure 2:
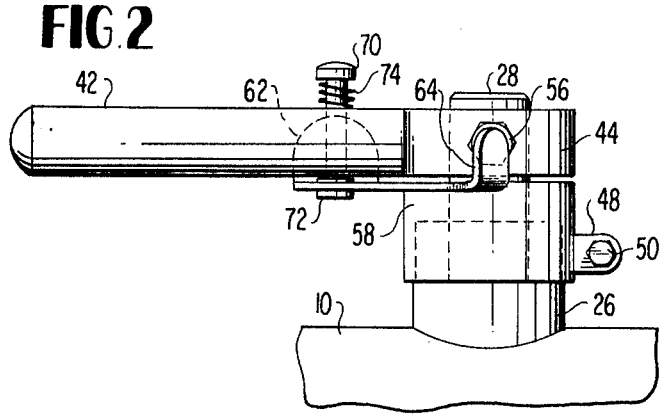
FIG. 2 is a side elevation view of the valve and locking arrangement as shown in FIG. 1.

The valve according to the present invention is suitable for use in a short connecting conduit 10 having a smooth internal cylindrical surface. Since the conduit 10 is used primarily as an intermediate connector, as between a fire hydrant and hose the conduit 10 is provided with a pair of end flanges 12 and 14. A typical fire hydrant connector 20 is freely rotatable with respects to a fitting 16 having a flange 18 which can be connected to the flange 12 of the conduit 10 by any suitable means such as a plurality of equally spaced bolts (not shown). Since there are several types of threads in use in the fire fighting industry the hose connector 22 having the desired thread thereon is provided with a flange 24 for connection to the flange 14 by any suitable means such as a plurality of equally spaced bolts (not shown).

Figure 3:
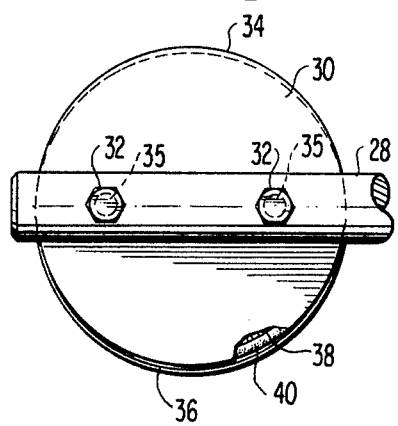
FIG. 3 is a side elevation view of the valve, partly broken away, according to the present invention.
Figure 4:
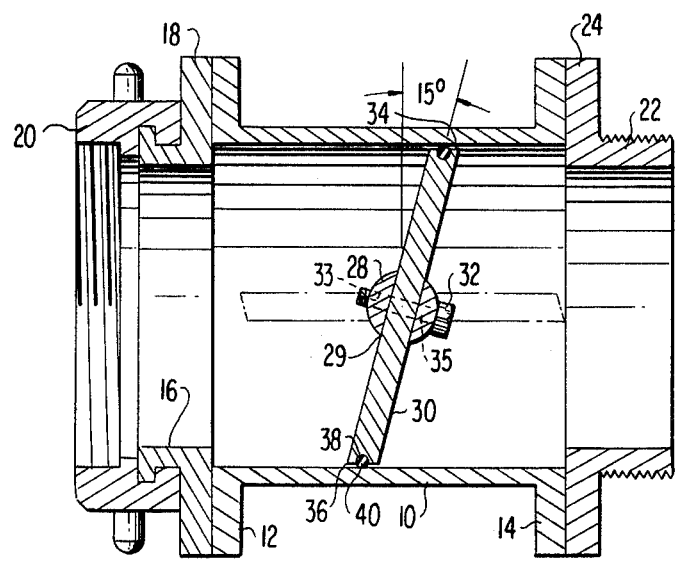
FIG. 4 is a longitudinal sectional view through the valve and conduit according to the present invention.

The conduit 10 is provided with a radially extending boss 28 through which the valve operating shaft 28 extends. The innermost end of the valve operating shaft is provided with a slot 29 in which the circular valve disc 30 is connected by means of a bolt 32 having a threaded shank 35 in threaded engagement with a bore 33 in the split end of the shaft 28. While two such bolts are utilized in FIG. 3 it is obvious that the number of bolts could be varied depending upon the size of the valve disc 30. The periphery of the valve disc 30 on one side of the shaft 28 is provided with a bevel 34 which increases from a minimum adjacent the shaft 28 to a maximum at the farthest distance from the shaft 28. Likewise, the periphery on the opposite side of the shaft 28 is provided with a bevelled surface 36 similar to but opposite from the bevelled surface 34. A groove 38 is provided about the entire periphery of the disc 30 and the resilient O-ring 40 of any suitable material is secured in the groove 38 by a suitable adhesive. When the valve 30 is in the closed position the valve disc will be disposed at an angle of approximately 15° to a transverse plane through the conduit and the length of the conduit 10 should be approximately equal to the diameter of the disc 30 to substantially locate the valve within the conduit when it is in its fully open phantom line position as shown in FIG. 4.

A handle 42 having a circular boss 44 at one end thereof is fitted over the end of the shaft 28 and secured thereto by means of a bolt 52 extending through aligned apertures in the boss 44 and shaft 28 and retained therein by means of the bolt head 56 and the nut 54.

A flat substantially quadrant-shaped locking plate 60 is integral with a split sleeve 58 which is slidably fitted over the boss 26 on the conduit 10. The sleeve 58 is provided with a pair of opposed protruding lugs 46 and 48 on opposite sides of the split which are drawn towards each other by means of the nut and bolt assembly 50 extending through apertures in the bosses 46 and 48. The locking plate 60 is provided with a pair of upturned end flanges 62 and 64 and is provided with a curved elongated slot 66 extending substantially between the flanges. The slot 66 is provided with a plurality of circular enlargements. There are two enlargements 68 located at each end of the slot and the number of intermediate enlargements can vary depending upon the number of intermediate locking positions desired.

A locking plunger 70 is slidably disposed in a bore through the handle 42 parallel to the shaft 28. The plunger 70 is provided with a cylindrical locking head adapted to be slidably disposed in the cylindrical enlargements 68 in the locking plate 60. The cylindrical locking member 72 is normally biased into engagement with the handle 42 by means of the spring 74 disposed between the handle 42 and the headed plunger 70 so that the locking member 72 will normally be disposed in a selected aperture 68.

Assuming the valve 30 is in the closed position when the handle 42 is locked in the position shown in FIG. 1, it is only necessary to depress the plunger 70 to unlock the handle 42 so that the handle 42 may be moved in the counterclockwise direction as viewed in FIG. 1 to rotate the shaft 28 and open the valve 30. When the valve is open to the desired degree and the locking member 72 is aligned with the appropriate enlargement 68 it is only necessary to release the plunger 70 and the spring 74 will move the locking member into locking engagement to hold the valve 30 in the selected open position.

In the event that the O-ring 40 begins to wear so that the disc 30 will be disposed in an angle of less than 15° to the transverse plane in the fully closed position the nut and bolt assembly 50 can be loosened to allow the locking plate 60 to be adjusted accordingly. Upon tightening of the nut and bolt assembly 50 the locking plate 60 will be secured in the new position so that when the handle 42 is locked in the end enlargement as shown in FIG. 1 the valve will be fully closed. A further advantage of the present invention resides in the fact that should the O-ring 40 be worn completely down or be missing from the groove 38 the split peripheral surface of the disc 30 will provide a substantially tight sealing engagement with the internal surface of the conduit 10.

While the invention has been particularly shown and described with reference to a preferred embodiment thereof it will be understood by those in the art that various changes in form and details may be made therein without departing from the spirit and scope of the invention.

What is claimed is:

1. A valve for use in a conduit having a smooth cylindrical internal surface comprising shaft means extending diametrically of said conduit, a circular valve disc, means for securing said valve disc to said shaft, said circular disc having oppositely bevelled surfaces on opposite sides of said shaft, an annular groove extending about the entire periphery of said disc, sealing means secured in said groove for sealing engagement with the internal surface of said conduit, adjustable locking means for locking said valve disc at a selected angle relative to a transverse plane through said conduit comprising handle means secured to said shaft means, a locking member movably mounted on said handle means, locking plate means having a plurality of locking apertures for said locking member and means for adjustably securing said locking plate to said conduit for infinite adjustment of said locking plate relative to said conduit.

2. A valve as set forth in claim 1 wherein said locking member is comprised of a plunger slidably mounted through an aperture in said handle means, said locking plate being disposed in close proximity to said handle means in a plane perpendicular to said shaft means and spring means normally biasing said plunger into locking engagement with a selected aperture in said locking plate.

3. A valve as set forth in claim 1 wherein said conduit is provided with a cylindrical boss through which said shaft means extends, split sleeve means secured to said locking plate and surrounding said boss and means for clamping said split sleeve means in an adjusted position on said boss.

* * * * *